(No Model.) 3 Sheets—Sheet 1.

F. J. & J. H. LANCASTER.
COIN CONTROLLED WEIGHING MACHINE.

No. 422,230. Patented Feb. 25, 1890.

Witnesses:
Inventors:
Frederick J. Lancaster
Joseph H. Lancaster
By attorneys (No Model.) 3 Sheets—Sheet 2.
F. J. & J. H. LANCASTER.
COIN CONTROLLED WEIGHING MACHINE.

No. 422,230. Patented Feb. 25 1890.

(No Model.) 3 Sheets—Sheet 3.
F. J. & J. H. LANCASTER.
COIN CONTROLLED WEIGHING MACHINE.

No. 422,230. Patented Feb. 25, 1890.

Witnesses:

Inventors:
Frederick J. Lancaster
and
Joseph H. Lancaster
by their Attorneys
Brown & Griswold

UNITED STATES PATENT OFFICE.

FREDERICK J. LANCASTER, OF NEW YORK, N. Y., AND JOSEPH H. LANCASTER, OF ARLINGTON, NEW JERSEY, ASSIGNORS TO THE NATIONAL WEIGHING MACHINE COMPANY, OF NEW YORK, N. Y.

COIN-CONTROLLED WEIGHING-MACHINE.

SPECIFICATION forming part of Letters Patent No. 422,230, dated February 25, 1890.

Application filed March 2, 1889. Serial No. 301,753. (No model.)

*To all whom it may concern:*

Be it known that we, FREDERICK J. LANCASTER, of the city, county, and State of New York, and JOSEPH H. LANCASTER, of Arlington, in the county of Hudson and State of New Jersey, have invented certain new and useful Improvements in Weighing-Machines, of which the following is a specification.

The class of weighing-machines to which our improvement relates is that in which a coin of certain weight and size is employed to render the machine operative. In this machine the weight is indicated by an index-finger or pointer working over a dial and the construction of the machine is such that the index-finger or pointer cannot operate except upon the insertion of the proper coin.

A further point of novely in our improvement consists in the means of preventing the weighing of more than one person at a time or for each coin inserted, and also in a means for maintaining the index-finger at a point on the dial indicating the weight of the person just weighed until the operating parts have returned to nearly a normal position after the person has got off of the weighing-platform.

Figure 2:
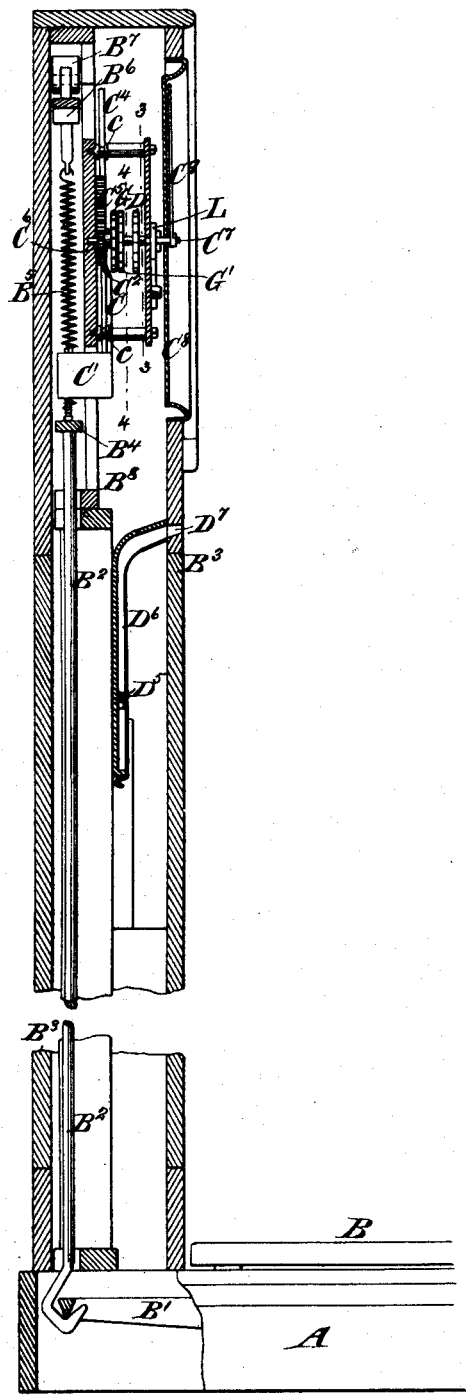
Figure 1:
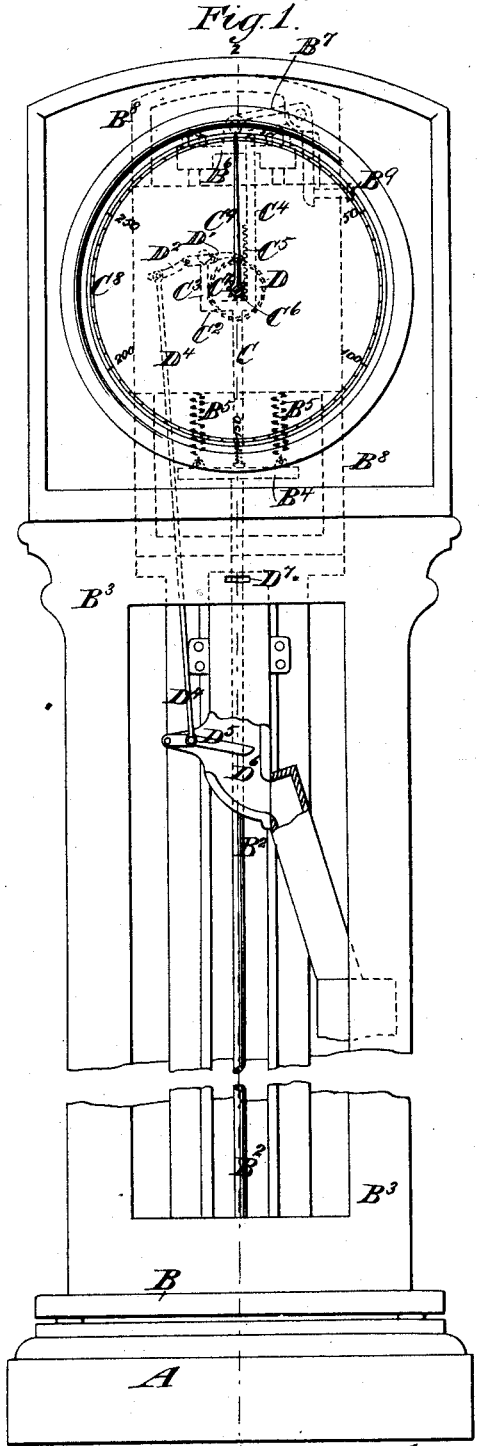
Figure 3:
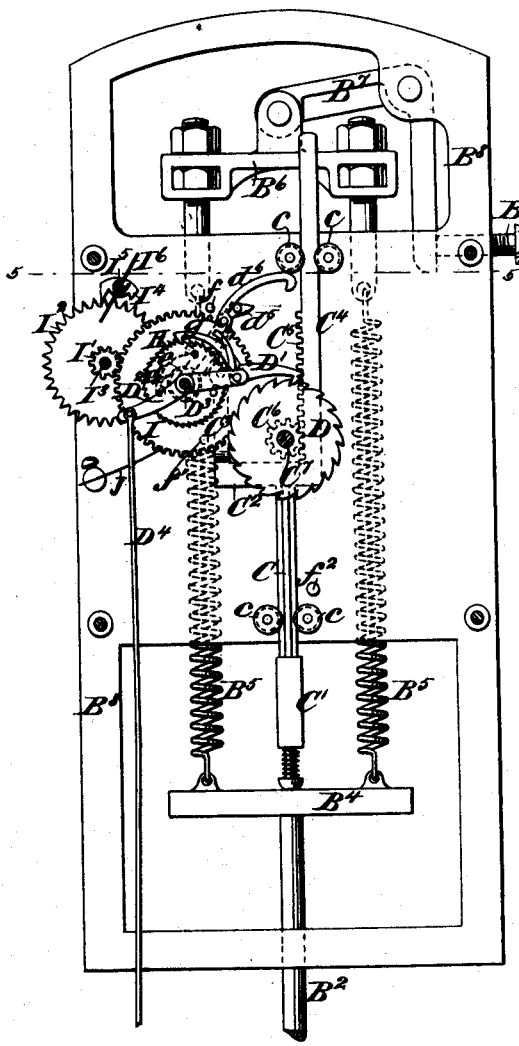
Figure 4:
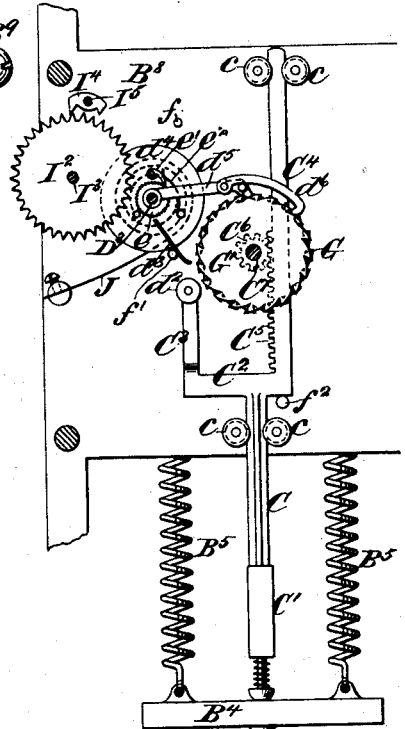
Figure 6:
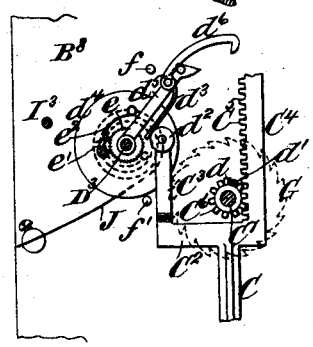
Figure 5:
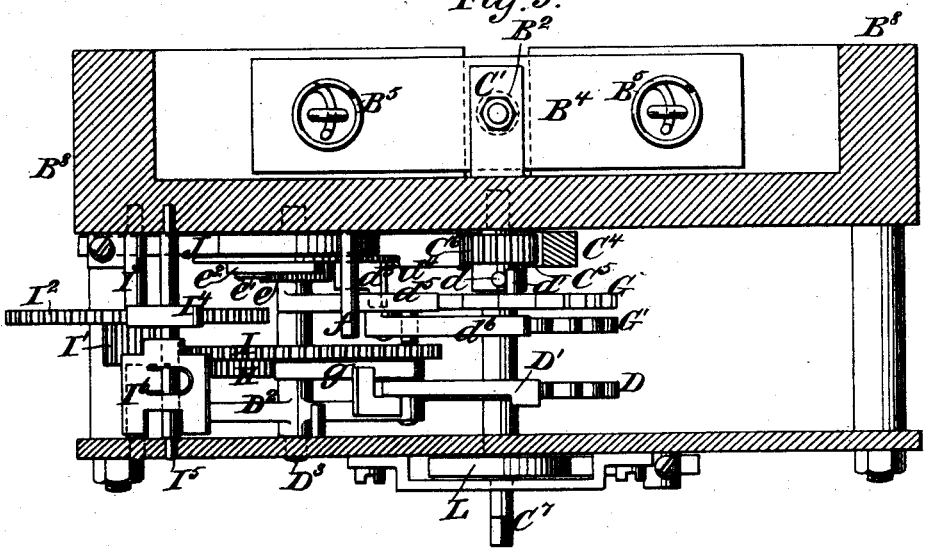
Figure 7:
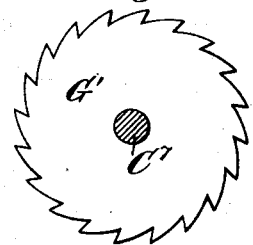
Figure 8:
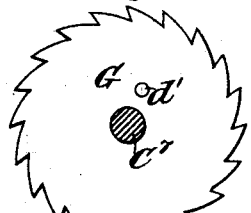
Figure 9:
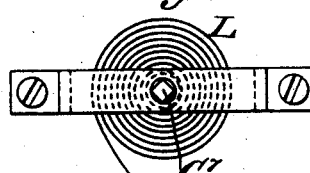

In the accompanying drawings, Figure 1 is a front view of a weighing-machine embodying our improvement, partly broken away. Fig. 2 is a vertical section taken on the line 2 2, Fig. 1. Fig. 3 is a sectional view taken on the line 3 3, Fig. 2. Fig. 4 is a detail in section taken on the line 4 4, Fig. 2. Fig. 5 is a horizontal section taken on the line 5 5, Fig. 3. Fig. 6 is a section of a detail view, also taken on the line 3 3, Fig. 2, certain parts being shown in a different position from that in which they are shown in Fig. 3. Figs. 7 and 8 are detail views, on an enlarged scale, of certain ratchet-wheels employed. Fig. 9 is a detail view, on an enlarged scale, showing a certain coil-spring.

Similar letters of reference designate corresponding parts in all the figures.

A designates the base of the machine.

B designates the weighing-platform, upon which the person to be weighed stands. Extending inwardly from this weighing-platform is an arm $B'$, which arm engages a vertically-extending rod $B^2$, extending upwardly through the interior of the case $B^3$ of the machine. This rod bears near its upper end a cross-bar $B^4$. Connected to this cross-bar near its ends are one of the ends of vertically-extending coil-springs $B^5$, which coil-springs are connected near their other ends to a support $B^6$ of the usual or any desired construction. As shown, this support is held up by one arm of a bell-crank lever $B^7$, fulcrumed upon a frame $B^8$. An adjusting-screw $B^9$, engaging a tapped hole in said frame and bearing against the other arm of the lever $B^7$, may be adjusted so as to admit of the rocking of the lever and the raising and lowering of the support $B^6$.

C designates a vertically-extending rod guided between guide-rollers $c$ during its vertical movements. The lower end of this rod is provided with a weight $C'$. A spring-actuated pin, with which said weight is provided, rests upon the top of the cross-bar $B^4$. The upper end of the rod C supports a frame $C^2$. The frame $C^2$ has two upwardly-extending arms $C^3$ $C^4$. Upon the arm $C^4$ is a rack $C^5$. The rack $C^5$ engages a pinion $C^6$, which pinion is loosely mounted upon a shaft $C^7$, journaled in the frame $B^8$ and extending centrally through a dial-plate $C^8$. Upon the outer end of the shaft $C^7$ is mounted an index-finger $C^9$. Upon the shaft $C^7$ is rigidly secured a ratchet-wheel D. Normally in engagement with the ratchet-wheel D is a pawl $D'$, which pawl is pivotally hung upon one arm of a lever $D^2$, which lever is loosely fulcrumed upon a shaft $D^3$, journaled in the frame $B^8$. To the other arm of the lever $D^2$ is connected one end of a rod $D^4$. The rod $D^4$ connects near its other end with a lever $D^5$, which lever extends into a chute or passage-way $D^6$, down which a coin inserted through a slot $D^7$ in the case $B^3$ will pass. The downward passage of the coin causes the rocking of the lever $D^5$, and thus the rod $D^4$ is drawn downwardly in such a way as to raise the pawl $D'$ out of engagement with the teeth upon the ratchet-wheel D. As the ratchet-wheel D is rigid upon the index-shaft $C^7$, the pawl $D'$ operates normally as a stop to prevent the rotation of the index-shaft, and consequently the maintenance of the index-finger at the zero-point. It is not until a coin has been inserted and the wheel D released from the pawl D' that the index shaft and finger may rotate.

Rigidly mounted upon the shaft C⁷ are two ratchet-wheels G G'. These ratchet-wheels are adjacent to each other and the teeth upon one extend in a reverse direction of those upon the other, as seen in Figs. 2, 5, 7, and 8.

Upon the hub of the pinion C⁶ is a pin or projection $d$, and upon the side of the ratchet-wheel G adjacent to the pinion C⁶ is a pin or projection $d'$. Normally these pins are in engagement, so that when the pinion C⁶ is rotated in one direction the rotation of the shaft C⁷ will ensue.

When a person or a weight is placed upon the platform B, the rod B² will operate to draw downwardly the cross-bar B⁴. If, now, the ratchet-wheel D be released from the stop-pawl D' by means of a coin, as previously described, the rod C will fall, carrying with it the frame C², and consequently the rack C⁵. This last being in engagement with the pinion C⁶, and the latter, as described, being locked with the ratchet-wheel G, the downward movement of the rack will result in the rotation of the shaft C⁷, and consequently in the movement of the index-finger about the dial.

Upon the arm C³ of the frame C² is a roller or bowl $d^2$. When said arm occupies its normal or elevated position, the roller or bowl bears against an arm $d^3$, formed upon or connected to a wheel or disk $d^4$. The wheel $d^4$ is loosely mounted upon the shaft D³; also, loosely mounted upon the shaft D³ is a pawl $d^5$. When the parts occupy their normal or elevated position, the arm $d^3$ bears against the under side of the pawl $d^5$ and raises the latter into an elevated position.

Pivotally mounted upon the pawl $d^5$ is a pawl $d^6$.

Assuming that the person or weight is upon the platform B and the arm C has been allowed to descend until it rested upon the cross-bar B⁴, the roller or bowl $d^2$ will of course have been moved downwardly and out of contact with the arm $d^3$. The wheel $d^4$ will then rotate and will permit the pawls $d^5$ $d^6$ to fall into such position that the tooth of one of said pawls will engage one of the ratchet-wheels G G', and the tooth upon the other of said pawls will engage the other of said ratchet-wheels. As the tooth on these pawls extend in reverse direction, it will be clear that the rotation of the ratchet-wheels G G', and consequently of the index-shaft C⁷, will be positively prevented until said pawls have been moved out of engagement with said ratchet-wheels. At the same time that the pawls $d^5$ $d^6$ fall to engage with the ratchet-wheels G G' the pawl D' also falls into a position where it will engage the teeth upon the ratchet-wheel D. It will therefore be seen that by the time the weight of a person has been indicated upon the dial the index-shaft C⁷ will have been locked in such manner that it cannot be rotated in either direction, and the pawl D' will also have locked the shaft so that it cannot rotate in a direction to indicate increased or additional weight placed upon the platform B until another coin has been inserted in the machine. By locking the index-shaft against rotation in either direction two persons cannot weigh upon the machine at the same time, and then one get off and the index-finger be caused to register a less weight.

We desire that the pawls $d^5$, $d^6$, and D' shall descend somewhat slowly, so as not to lock the index-shaft C⁷ until the index-finger C⁹ has ceased vibrating. For this purpose we employ a retarding device. The retarding device consists of a gear-wheel I, rigidly mounted upon the shaft D³. This gear-wheel gears with a pinion I', secured to an escapement-wheel I². The pinion and escapement-wheel are mounted upon a shaft I³, journaled in the frame B⁸. Co-operating with the escapement-wheel I² is a verge I⁴, mounted upon a rock-shaft I⁵. Upon the rock-shaft I⁵ is a vibrating governor I⁶. When the parts occupy their normal or elevated position, a coil-spring J, one end of which is secured to the frame B⁸ and the other to the wheel $d^4$, is coiled up. Upon the shaft D³, adjacent to the wheel $d^4$, is rigidly secured a ratchet-wheel $e$. A pawl $e'$ upon the wheel $d^4$, actuated by a spring $e^2$, engages the ratchet-wheel $e$. When the support of the roller $d^2$ has moved from beneath the arm $d^3$ upon the wheel $d^4$, the latter is rotated by the tendency of the spring J to uncoil, and through the ratchet-and-pawl engagement between said wheel and the shaft D³ the latter is rotated, thereby causing the rotation of the wheels I I' and the escapement I². The escapement prevents a too sudden rotation of the shaft D³, and as the pawls $d^5$ $d^6$ are upheld by the arm $d^3$ upon the wheel $d^4$ said pawls will be caused to descend slowly.

Secured to the gear-wheel I is a ratchet-wheel H, and upon the lever D² is a pawl $g$, adapted to engage the teeth upon the ratchet-wheel H. When a coin has operated to rock the lever D² and raise the pawl D', the pawl $g$ rides around upon the teeth of the ratchet-wheel H until the upward movement of the pawl D' ceases. The pawl $g$ will then engage one of the teeth upon the ratchet-wheel H. As the shaft D³ rotates, the ratchet-wheel H of course rotates with it, carrying the pawl $g$ around and permitting the pawl D' to again drop down into engagement with one of the teeth upon the ratchet-wheel D. This movement is somewhat quicker than the downward movement of the pawls $d^5$ $d^6$. The coil-spring J is recoiled and the index-finger returned to the zero-point during the upward movement of the rod C.

Near one of the ends of the index-shaft C⁷ is a coil-spring L, which coil-spring is secured near its other end to the frame B³. When a person gets off the platform B, or a weight is removed therefrom, the rod B², together with the cross-bar $B^4$, is moved up very suddenly by means of the springs $B^5$. This movement also suddenly raises the rod C and the frame $C^2$. The roller or bowl $d^2$ on the arm $C^3$ contacts with the arm $d^3$ upon the wheel $d^4$, causing the rotation of said wheel until said arm strikes the pawl $d^5$, whereby said pawl and the pawl $d^6$ are moved out of engagement with the ratchet-wheels G G'. The continued upward movement of the arm $C^3$ and roller or bowl $d^2$ raises the pawls $d^5$ $d^6$ to their most elevated position, and as the wheel $d^4$ is being constantly rotated during this movement, the coil-spring J becomes rewound, at the same time the pawl $e'$ is playing freely over the teeth of the ratchet-wheel $e$.

We have shown stop-pins $f$ $f'$ on the frame $B^8$ for preventing the rotation of the wheel $d^4$ too far in either direction. When the wheel rotates in one direction, the pawl $d^5$ will contact with the stop-pin $f$, and when it rotates in the other direction the arm $d^3$ will contact with the stop-pin $f'$. A stop-pin $f^2$ prevents a too extended downward movement of the frame $C^2$. A too extended upward movement of said frame is prevented by the weight $C'$ contacting with a portion of the frame $B^8$. It is to be remembered that the pinion $C^6$ is loose upon the index-shaft $C^7$. When the frame $C^2$ is moving upwardly, the rack $C^5$ operates to rotate said pinion freely upon the shaft for nearly a complete rotation, because the pin $d$ will be moved away from contact with the pin $d'$. It is not until the frame $C^2$ has nearly reached the limit of its upward movement that the arm $d^3$ contacts with the pawl $d^5$, to lift the latter and pawl $d^6$ out of engagement with the wheels G G'. When this operation occurs, the coil-spring L operates to rotate the shaft $C^7$ and the ratchet-wheels G, G', and D in a contrary direction to that in which they were rotated when the frame $C^3$ was moved downwardly. During this operation the pawl D' passes freely over the teeth of the wheel D. It is to be understood that the coil-spring L is recoiled during the opposite rotation of the shaft $C^7$, or that occasioned by the downward movement of the frame $C^2$. When the shaft $C^7$ is being rotated by the spring L, the pin $d'$, passing round with the ratchet-wheel G, again contacts with the pin $d$ on the pinion $C^6$ and follows it to its normal position.

What we claim as our invention, and desire to secure by Letters Patent, is—

1. In a weighing-machine, the combination, with an index-shaft, of ratchet-wheels on said shaft, the teeth upon one wheel being inclined in a reverse direction to those upon the other, pawls for engaging the teeth on said wheels, but normally out of engagement therewith, and a retarding device for preventing a too sudden engagement of the pawls with the ratchet-wheel teeth, substantially as and for the purpose specified.

2. In a weighing-machine, the combination, with an index-shaft, of two ratchet-wheels mounted on said shaft, the teeth upon one wheel being inclined in a reverse direction to those upon the other, pawls for engaging the teeth on said wheels, but normally out of engagement therewith, a third ratchet-wheel, also mounted on said shaft, a pawl for engaging the teeth on the last-named ratchet-wheel, the latter operated upon the insertion of a coin to release said last-named ratchet wheel and pawl, and a retarding device acting upon all said pawls to prevent a too sudden engagement of the pawls with their respective ratchet-wheels, substantially as specified.

3. In a weighing-machine, the combination, with an index-shaft, of a ratchet-wheel on said shaft, a pawl for engaging said wheel, but normally out of engagement therewith, a pinion loosely mounted on said shaft, pins or projections on said ratchet, and a pinion, and a rack engaging said pinion, whereby, when the said rack is moved in one direction, the pin or projection upon the pinion will cause the rotation of said ratchet-wheel and index-shaft, but when said rack is moved in the other direction said pinion will rotate freely, substantially as specified.

4. In a weighing-machine, the combination, with a vertically-movable frame provided with a rack, an index-shaft, a pinion loosely mounted on said index-shaft, two ratchet-wheels mounted on said shaft, the teeth upon one of said wheels extending in reverse direction to those upon the other, pawls for engaging said ratchet-teeth, but normally out of engagement therewith, a third ratchet-wheel on said shaft, a pawl for engaging said ratchet-wheel operated upon the insertion of a coin in the machine to release said ratchet-wheel and to permit the rotation of the index-shaft, a pin or projection on one of said ratchet-wheels, and another pin or projection on said loose pinion, whereby, when said frame is moved downwardly, the pin upon the loose pinion will operate to cause the rotation of said ratchet-wheels and index-shaft, but when said frame is moved upwardly the loose pinion will rotate freely, substantially as specified.

5. In a weighing-machine, the combination, with an index-shaft, of ratchet-wheels on said shaft, the teeth upon one of said ratchet-wheels being inclined in a reverse direction to those upon the other, pawls for engaging said ratchet-teeth, but normally out of engagement therewith, and a retarding device comprising an escapement for preventing the too sudden engagement of said pawls with the ratchet-wheels, substantially as specified.

FRED. J. LANCASTER.
    JOSEPH H. LANCASTER.

Witnesses:
 FRANK B. CHASE,
 J. G. BENNETT.

It is hereby certified that in Letters Patent No. 422,230, granted February 25, 1890, upon the application of Frederick J. Lancaster, of New York, N. Y., and Joseph H. Lancaster, of Arlington, New Jersey, for an improvement in "Coin-Controlled Weighing-Machines," an error appears in the printed specification requiring the following correction, viz: Line 88, page 3, should read *projections on said ratchet and pinion, and* instead of "projections on said ratchet, and a pinion, and;" and that the said Letters Patent should be read with this correction therein that the same may conform to the record of the case in the Patent Office.

Signed, countersigned and sealed this 4th day of March, A. D. 1890.

[SEAL.]

Countersigned:

C. E. MITCHELL,
 *Commissioner of Patents.*

CYRUS BUSSEY,
*Assistant Secretary of the Interior.*